Oct. 23, 1962 T. A. LIIMATAINEN ET AL 3,060,336
ELECTRIC MOTOR
Filed March 18, 1957

INVENTORS.
TEUVO A. LIIMATAINEN.
BY WILLIAM R. JEWELL.

Herman Seid
ATTORNEY.

United States Patent Office 3,060,336
Patented Oct. 23, 1962

3,060,336
ELECTRIC MOTOR
Teuvo A. Liimatainen, Fayetteville, N.Y., and William R. Jewell, Denver, Colo., assignors, by direct and mesne assignments, to Carrier Corporation, Syracuse, N.Y., a corporation of Delaware
Filed Mar. 18, 1957, Ser. No. 646,636
4 Claims. (Cl. 310—68)

The present invention relates to electric motors and more particularly to electric motors capable of attaining ultra high speeds.

With the advance of technology, the trend has been toward cost reduction and small size. In order to escape bulk, the trend in motors and engines has been toward higher speed machines. This is especially evidenced, in equipment such as turbines and compressors wherein the operating speeds have gone from the realm of a few thousand revolutions per minute to a hundred thousand revolutions per minute. As an example, in aircraft air conditioning applications, small, high speed axial and centrifugal compressors are utilized to provide small, lightweight, large-capacity refrigeration systems. In order to operate this type of system, however, it has been extremely difficult to provide a suitable prime mover for the compresssor.

Various methods have been suggested to obtain high speeds, such as the use of turbines connected in tandem with the compressors and also the use of low speed drives combined with extensive gear trains. In the case of turbine equipment, although the turbine drive is rather compact, an extensive system is required as a source of high pressure working fluid to motivate the turbine. Gear trains have been found to be bulky, expensive, and very often have posed their own special problems.

Alternating current is most commonly available for the energization of machines and it is especially desirable that the prime mover utilize this source of energy as a driving force. Unfortunately, alternating current machines are usually restricted to synchronous speeds which are a function of the frequency of the current supply. The highest synchronous speed normally available is 3600 revolutions per minute which is a result of the normal 60-cycle current source. To avoid this problem, alternating current motor-direct current generator sets have been suggested so that a direct current motor could be utilized as an ultimate prime mover. It is well-known that the direct current motors are not impeded by synchronous speeds. Unfortunately, this type of system has a disadvantage in that it requires extensive preparatory equipment to generate the direct current for the high speed motor. Frequency multipliers such as electronic circuits and saturable reactors have been devised to obtain high synchronous speeds. However, these devices are expensive and problematic.

When direct current is available, certain problems also arise in the operation of direct current motors. Normally these motors require brushes and commutators. These brushes at normal speeds are very satisfactory. However, at ultra high speeds they very often fail due to arcing, mechanical failure of commutator bars due to centrifugal force and also due to the transfer of carbon from the brushes to the commutator or slip ring. No satisfactory high speed motor is presently available.

The most desirable motor for this purpose should operate on an alternating current source and possess direct current motor characteristics. However, the motor should be minus the usual disadvantages of direct current motors, namely the use of commutators and brushes. There have been suggested many motors utilizing alternating current with suitable devices wherein direct current characteristics can be attained by means of a rectifier and without the use of brushes and commutators. This is accomplished by a transformer effect wherein a primary transformer winding induces current into a secondary transformer winding mounted upon the rotor of the motor. Unfortunately, by the nature of the rotor windings, the machine would be either inoperable or confined to some synchronous speed defined by the frequency of the alternating current source because a commutator or some other switching device is necessary to control the direction of current flow in the rotor. In many cases ingenious switching devices or arrangements have been devised to change the direction of current passing through the rotor windings without the use of commutator and brushes. However, these machines have been found to be extremely inefficient.

The chief object of this invention is to provide a high speed alternating current motor.

Another objective is to provide an alternating current motor with direct current motor speed characteristics.

A further objective is to provide a brushless unipolar or homopolar motor.

A still further objective is to provide a high speed brushless unipolar motor capable of operating from an alternating current source. These and other objects of the present invention will be more readily perceived from the following description.

This invention relates to an alternating current motor which employs an alternating current primary transformer winding and a direct current field winding. A rotor is provided and is inductively associated with these windings. This rotor has an alternating current secondary transformer winding connected in series with a rectifier and a direct current unipolar motor rotor winding which is supplied with direct current through the rectifier while being operatively associated with the direct current field winding. The secondary transformer winding is inductively associated with the primary alternating current transformer field winding so that the entire structure provides a unipolar motor not requiring the use of brushes or commutators.

This invention may be better understood by referring to the accompanying drawings in which.

Figure 1:
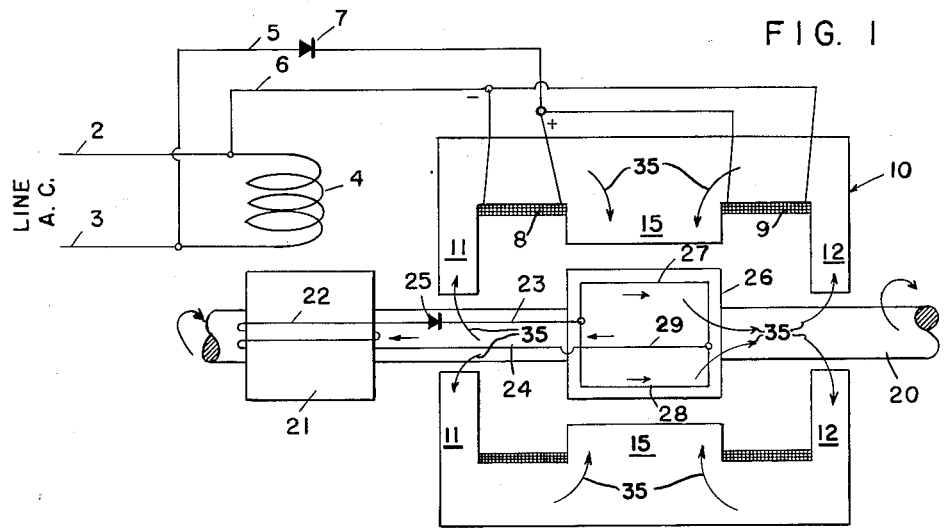
FIGURE 1 is a diagrammatic view of the motor comprising the present invention.

Referring to the drawings, there is shown in FIGURE 1 a diagrammatic view of the present invention. The lines 2 and 3 are connected to a source of alternating current. Normally this will be of the 60-cycle variety commonly supplied by utility companies. Lines 2 and 3 are directly connected across the primary winding 4. This transformer winding has a large number of turns of small diameter wire. As will be later perceived, this transformer is a step-down transformer. Directly connected acrosss the transformer windings 4 are the conductors 5 and and 6. Located in the line 5 is a rectifier 7 which may be of the vacuum tube type such as a mercury-arc or of the crystal type such as selenium or germanium. It will be noted that in the present disclosure a single wave rectifier as shown; however, it will be readily apparent to one skilled in the art that in many cases full wave rectifiers may be more desirable. The direct current so rectified from the alternating current source is then connected across the windings 8 and 9.

These windings are wrapped around the field stator 10. It will be noted by referring to FIGURE 1 that this stator is so constructed that a plurality of pole faces are set up. At the extremities of the stator there are located the pole faces 11, and 12. At the center part of the stator, the pole face 15 is situated. Normally pole face 15 will extend through an angle of 360°. It will be appreciated that the representation of a homopolar or unipolar motor shown in FIGURE 1 is diagrammatic in nature rather than pictorial and that any suitable conventional homopolar motor stator configuration may be employed for the purposes of this invention such as are well known in the art. It will also be appreciated that each of pole faces 11, 15, and 12 will normally extend through an angle of 360° to provide flux fields 36 shown in the drawing.

By noting the polarity and the manner in which the windings 8 and 9 are disposed with respect to the stator 10, it will be observed that a pair of substantially toroidal flux fields are set up which extend between pole face 15 and pole faces 11 and 12 respectively. The magnetic flux passes through pole face 15 and rotor 26 and extends into pole face 11 at the left-hand side of the drawing in order to set up one toroidal flux field. Other flux lines are shown as passing from pole face 15 through rotor 26 into pole face 12 on the right-hand side of the drawing illustrating a second toroidal flux field. It will be immediately perceived that by this construction the rotor 26 is pierced by lines of flux in a direction extending radially inward along the entire periphery of the rotor.

Referring now to the rotor section of the motor construction shown in FIGURE 1, there is shown a shaft 20 which is suitably journalled (not shown) on suitable antifriction bearing means. Mounted on this shaft is a suitable secondary transformer core 21. This core is located adjacent the primary transformer winding 4. It will be appreciated that the transformer winding 4 may have a similar core fabricated of soft iron which will thereby greatly increase the efficiency of the transformer. The transformer core 21 is provided with a suitable secondary winding 22 which will be of relatively few turns of relatively large diameter wire. One will appreciate that this construction is a standard type step-down transformer. A unipolar motor normally operates at a very low voltage and at a very high current rating. By inductively connecting the windings 4 and 22, the high voltage current source is suitably changed to a high current, low voltage output suitable for normal unipolar operation in such a manner as to obviate the need for cumbersome brush and commutator structures so characteristic of unipolar motors.

The low voltage, high current alternating current output of the secondary winding 22 is then passed through the lines 23 and 24 to the rotor 26. Located in the line 23 is the rectifier 25. This may be of the usual crystal or dry plate type.

The direct current so obtained is passed to the rotor 26 which comprises a plurality of conductors 27 and 28 which are normally disposed in a circular configuration longitudinally parallel to the axis 20 along the outer periphery of the rotor 26. The current passing through the conductors 27 and 28 originates from the line 23 and passes from the left to the right. The current is then passed from the outer conductors 27 and 28 to a central collector conductor 29 which is connected to the line 24 which is directly connected to the secondary transformer winding 22.

Figure 2:
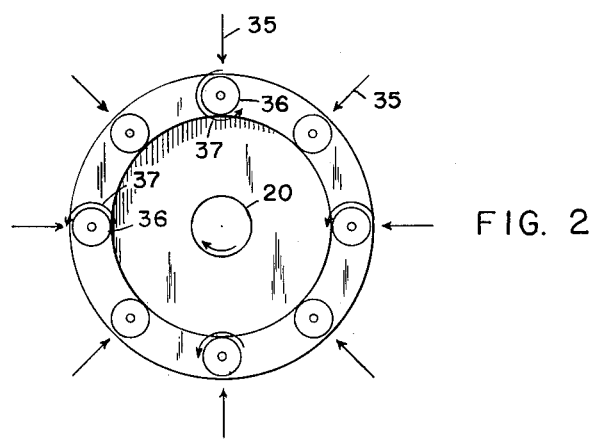
FIGURE 2 is a cross-sectional view of the unipolar motor rotor shown in FIGURE 1.

Referring to FIGURE 2, there is shown a cross sectional view of the rotor 26 taken through a plane normal to the axis of the shaft 20. It will be noted from this figure that the rotor comprises a plurality of rotor bar conductors 36 equally spaced in an orbit concentric with the shaft axis 20.

Figure 3:
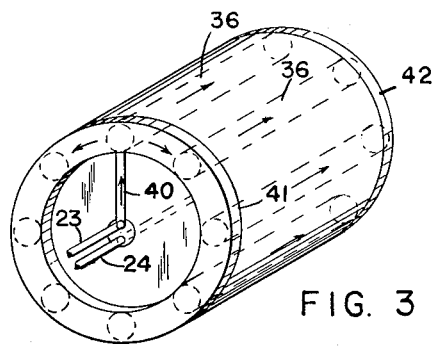
FIGURE 3 is a perspective view of the rotor shown in FIGURE 2.

Referring to FIGURE 3, there is shown a perspective view of the rotor. The rotor bars 36 are shown as being parallel to the axis of rotation of the rotor. The ends of the rotor are provided with suitable collector rings 41 and 42. These rings are connected to the respective ends of the bars 36. The ring 41 is connected by a suitable conductor 40 to the line 23 which is noted to be one of the lines connected to the secondary transformer winding 22.

FIGURE 3 also indicates the line 24 which also extends from the secondary transformer winding into the rotor. This line is connected to the conductor 29 (not shown) which is similarly connected to a conductor forming a return from the collector ring 42.

Considering the operation of the present invention, current is passed through the lines 2 and 3 into the primary transformer winding 4 and simultaneously this alternating current source is rectified to direct current by the rectifier 7 and passed into the field windings 8 and 9. These various windings will simultaneously build up lines of flux and determine precise flux fields. Naturally, the windings 4 will set up an alternating current field whereby the lines of flux will build up and deteriorate in accordance with the frequency of the current source. Because of this building up and deterioration of a flux field, the windings of the secondary position of the transformer will be continually cut by lines of flux, thereby inducing a current into the secondary windings of the transformer. Because of the physical nature of the transformer the energy generated in the secondary windings will be of a low voltage, high current nature. Normally this potential will be in the vicinity of 7½ volts. The secondary windings are located on the rotor shaft and the current induced therein will be passed through a suitable rectifier 25 which will change the alternating current to direct current.

While this transformer action is going on, the direct current passing through the windings 8 and 9 determines a constant flux direction originating from the pole face 15 and passing through the rotor 26, shaft 20 and back into the stator 10 at pole faces 11, 12, and concluding their circuitous paths at the pole face 15.

Referring now to FIGURE 2, there is shown the various lines of flux which originate at the pole face 15 and which extend radially inward toward the center of the shaft 20. As these lines of flux extend inwardly they co-act with other lines of force which will be described hereafter.

Referring now to FIGURE 3, it will be noted that current flows through the conductor 23 from the rectifier 25 through the conductor 40 to the collector ring 41. The current from the collector ring 41 passes through the various rotor bars 36 toward the collector ring 42. The collector ring 42 is similarly connected as ring 41 so that current is returned through line 24 to the secondary winding 22.

Referring to FIGURE 2, it will be seen that the motor shown in FIGURE 1 utilizing the rotor shown in FIGURE 3 will cause current to pass through the rotor bars 36 in FIGURE 2 upwardly from the plane of the section shown in said FIGURE 2. This direction of current will cause lines of flux to occur about the various rotor bars 36. These lines of flux 37 are shown passing in a counterclockwise direction about the various rotors 36.

Noting the lines of flux originating from the stator 10 at pole 15 and also the lines of flux created by the passage of current through the rotor bars 36, a co-action between the lines of flux 35 and 37 occurs which is readily apparent to one skilled in the art, to be the normal action of a unipolar or homopolar motor. The co-action of the lines of flux 35 and 37 creates an unbalanced torque upon each rotor bar 36, the cumulative effect of all of the torques on all of these rotor bars create a clockwise torque on the entire rotor section so that a motor effect is attained.

From the foregoing description it is readily apparent that the difficulties of a normal unipolar motor have been overcome in such a manner that the low voltage, high current characteristics are of no consequence since the troublesome and cumbersome commutator and brush structure which require air and water cooling are eliminated. Simultaneously a motor is available which is capable of operating on an alternating current source with the characteristics of a direct current motor that has the ability to attain ultra high speeds without the normal commutator disadvantages of direct current motors.

While we have described a preferred embodiment of the invention, it will be understood that the invention is not limited thereto since it may be otherwise embodied within the scope of the appended claims.

We claim:

1. A brushless, alternating current energized electric motor system adapted to operate at a speed independent of the frequency of said alternating current, comprising a rotatable shaft, a stationary primary transformer winding, means to connect said primary transformer winding to a source of alternating current, a rotatable secondary transformer winding mounted on said shaft and inductively coupled to said primary transformer winding so as to have a current induced therein, a rectifier connected to said rotatable secondary transformer winding to provide a source of unidirectional current therefrom, a rotatable unipolar motor rotor winding mounted on said shaft, said unipolar motor rotor winding being electrically connected to the unidirectional current output of said rectifier to provide excitation for said rotor winding, a stationary unipolar member including a unipolar stator winding disposed adjacent said unipolar rotor winding and means to provide unidirectional current to said unipolar stator winding so that the speed of said brushless motor system is independent of said alternating current frequency.

2. An electric motor system as defined in claim 1 in which said stationary primary transformer winding and said rotatable secondary transformer winding have a turns ratio relative to each other such that they comprise a rotary step-down transformer.

3. An electric motor system as defined in claim 1 in which said unipolar rotor winding comprises a plurality of conductors disposed in parallelism with each other and with the axis of the rotor, said conductors being circularly disposed about the rotor axis so that unidirectional current from said rectifier passes through each of said conductors in the same direction.

4. An electric motor system as defined in claim 1 in which said unipolar stator winding is constructed to pass lines of flux in a radially inward direction through said unipolar motor rotor throughout an angle of substantially 360°.

References Cited in the file of this patent

UNITED STATES PATENTS

| | | |
|---|---|---|
| 1,199,444 | Varley | Sept. 26, 1916 |
| 1,791,978 | Sessions | Feb. 10, 1931 |
| 2,204,916 | Shotter | June 18, 1940 |
| 2,414,287 | Crever | Jan. 14, 1947 |

FOREIGN PATENTS

| | | |
|---|---|---|
| 302,931 | Great Britain | Dec. 5, 1929 |